(12) United States Patent
Schwartz et al.

(10) Patent No.: US 8,612,387 B2
(45) Date of Patent: *Dec. 17, 2013

(54) SYSTEM AND METHOD FOR MANAGING, CONTROLLING AND/OR RENDERING MEDIA IN A NETWORK

(75) Inventors: Rick Schwartz, Carlsbad, CA (US); Daan Wilkens, Cardiff, CA (US); I. Starlight Mundy, San Diego, CA (US); Joel Espelien, San Diego, CA (US)

(73) Assignee: PacketVideo Corp., San Diego, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/526,022

(22) Filed: Jun. 18, 2012

(65) Prior Publication Data

US 2012/0260169 A1    Oct. 11, 2012

Related U.S. Application Data

(63) Continuation of application No. 12/383,870, filed on Mar. 30, 2009, now Pat. No. 8,224,775.

(60) Provisional application No. 61/072,426, filed on Mar. 31, 2008.

(51) Int. Cl.
*G06F 3/048* (2013.01)
*G06F 19/26* (2011.01)

(52) U.S. Cl.
USPC ........... 707/620; 707/610; 715/203; 715/716; 709/250

(58) Field of Classification Search
None
See application file for complete search history.

(56) References Cited

U.S. PATENT DOCUMENTS

| | | | |
|---|---|---|---|
| 6,011,553 A * | 1/2000 | Komiyama | 715/839 |
| 2006/0161635 A1* | 7/2006 | Lamkin et al. | 709/217 |
| 2008/0034029 A1* | 2/2008 | Fang et al. | 709/203 |
| 2009/0198787 A1* | 8/2009 | Broda et al. | 709/209 |

* cited by examiner

*Primary Examiner* — Ajay Bhatia
*Assistant Examiner* — Miranda Huang
(74) *Attorney, Agent, or Firm* — Patents + TMS, P.C.

(57) ABSTRACT

A system and a method manage, control and/or render media in a network. The system utilizes a media management application that manages, controls and/or renders digital media files in the network. A user browses, searches, manages and/or consumes content from multiple storage devices and servers in the network. The user may view a visual representation of active media connections between the available servers and/or the available rendering devices connected to the network.

20 Claims, 5 Drawing Sheets

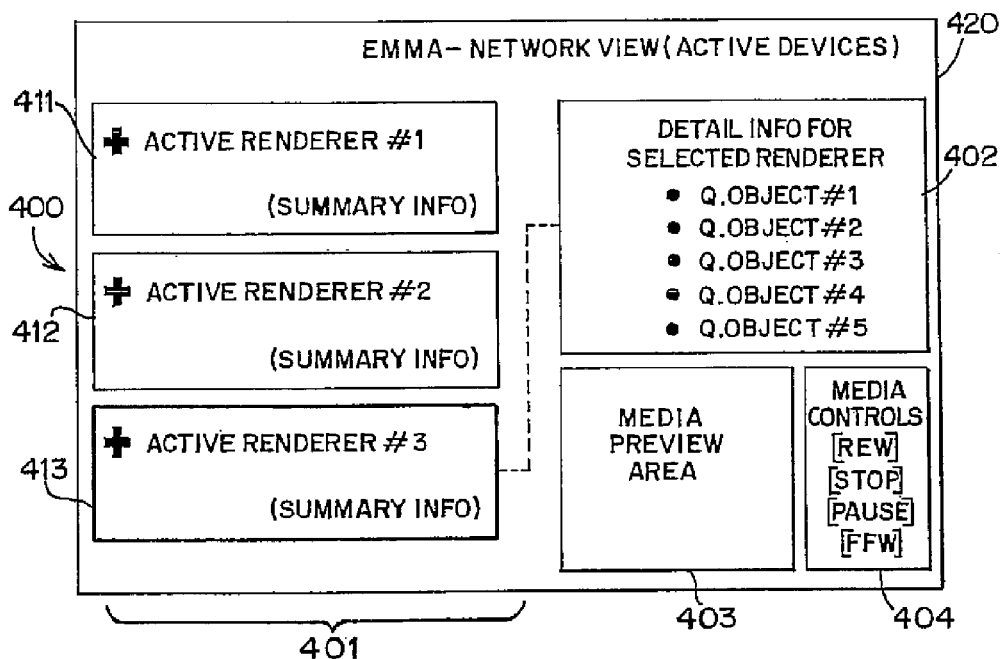
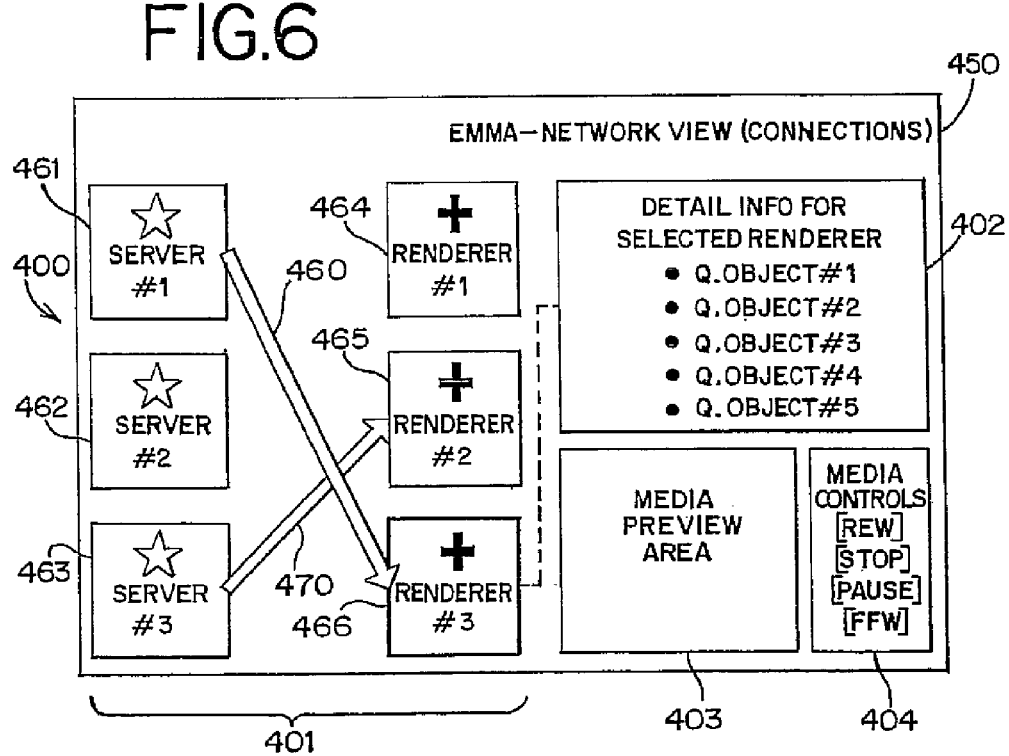

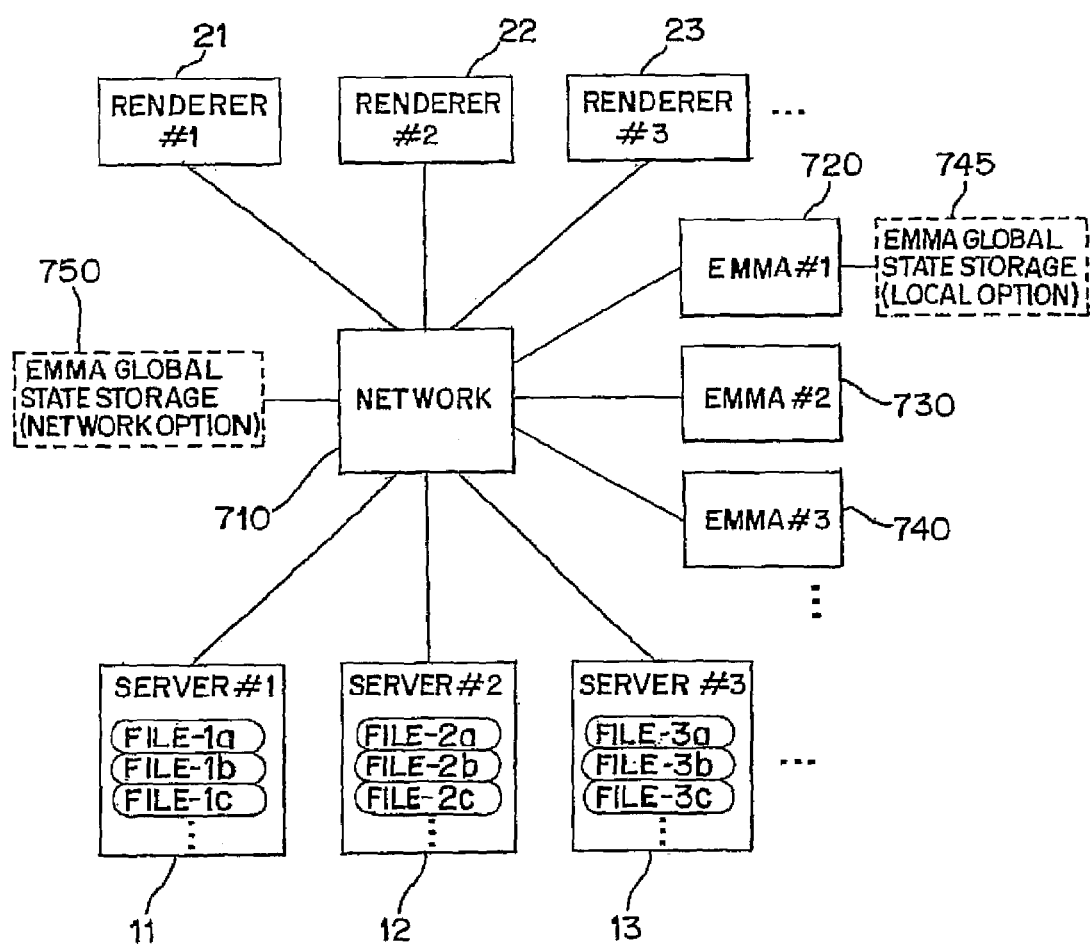

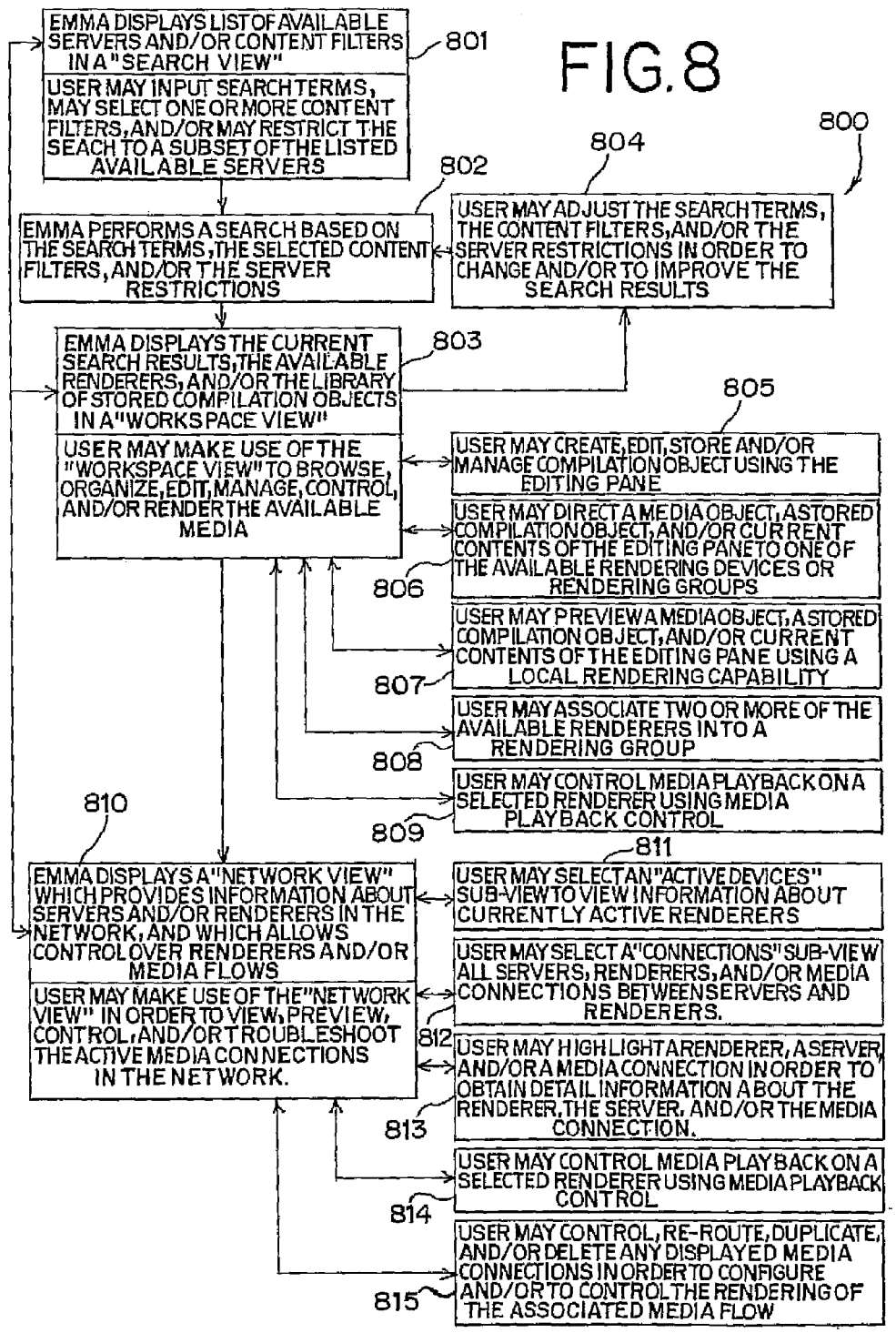

SYSTEM AND METHOD FOR MANAGING, CONTROLLING AND/OR RENDERING MEDIA IN A NETWORK

This application is a continuation application of and claims the benefit of U.S. application Ser. No. 12/383,870 filed Mar. 30, 2009 now U.S. Pat. No. 8,224,775 and further claims the benefit of U.S. Provisional Application Ser. No. 61/072,426 filed Mar. 31, 2008.

BACKGROUND OF THE INVENTION

The present invention generally relates to a system and a method for managing, controlling and/or rendering media in a network. More specifically, the present invention relates to a system and a method that utilize a media management application to manage, control and/or render media from a collection of digital media files in the network. The system and the method allow a user to browse, search, manage and/or render content from multiple storage devices and/or servers in the network. The user may view a visual representation of active media connections between the available servers and/or the available rendering devices connected to the network.

It is well known for a user to obtain media for consumption in the home using several distinct channels. For example, television content may be delivered via terrestrial broadcast or a dedicated cable connection and/or may be consumed using a traditional television. Radio broadcasts and/or music broadcasts may be received and/or consumed via radio receivers or stereo units. Media, such as movies, television shows, television series, music albums and the like, may be purchased on digital versatile disc ("DVD"), videotape, compact disc ("CD") or the like, and the media may be played by media players in the home. Moreover, the user may record television broadcasts and/or radio broadcasts to collect content according to personal preferences. Traditionally, the television broadcasts and/or the radio broadcasts may be recorded using video tapes or audio cassettes. Further, the television broadcasts and/or the radio broadcasts may be recorded using more modern technology, such as a Digital Video Recorder ("DVR") or a DVD recorder device. Therefore, the user may build a personal media collection to match their personal preferences via a combination of media purchases and broadcast recording.

However, individual media objects in the personal media collection may be linked to specific physical media, such as, for example, a CD, a DVD, a videotape or the like. The individual media objects in the personal media collection may be confined to a specific device, such as, for example, a DVR associated with a single specific rendering device.

The recent emergence of home networking technologies, combined with the increasing popularity of digital media files, is improving usefulness of home media collections. The user may purchase audio titles and/or video titles online as media files that may be collected on one or more storage devices in a home network. The user may browse the media files remotely from one or more "control points" in the network and may consume a specific media file on any compatible rendering device connected to the home network. In addition, some types of media, such as, for example, audio CDs, home movies, physical photographs and the like, may be converted to digital media files that may be organized and/or may be consumed via the home network. The ability to organize, browse and consume media is enhanced by the availability of home networking technologies, such as IEEE 802.11, and connection technologies, such as Universal Plug and Play ("UPnP") and Digital Living Network Alliance ("DLNA"). The home networking technologies and the connection technologies allow distribution of multimedia content between various storage devices and associated rendering devices in the home network.

Current multimedia home networking solutions are an improvement over past systems. However, existing control point applications and media management tools are typically lacking in functionality. A control point application is an application which controls UPnP compatible servers and UPnP compatible rendering devices. For example, a control point application may allow the user to browse and/or find content, such as a digital video file or a digital audio file, that is stored on a particular UPnP server. The control point application may allow the user to transmit the content to a particular UPnP rendering device for consumption. A typical control point application may run on a personal computer ("PC") attached to the home network, may be embedded in a "remote control" device, and/or may be embedded on the particular UPnP rendering device. The control point application may be executed on a portable computing device, such as, for example, a mobile telephone or a Personal Digital Assistant ("PDA").

Typically, the control point application allows the user to select a storage device, such as a UPnP compliant server, and browse available content via a directory hierarchy exposed on the selected storage device. The control point application allows the user to choose a content object or compilation from the content objects and compilations available on the selected storage device. A compilation is a user-defined list of media objects, such as, for example, an audio playlist, photo albums and/or a digital photo slideshow. The control point application allows the user to select the desired rendering device and initiate rendering of the selected content object or compilation.

All of these steps are not required in all cases. For example, an embedded control point in a DLNA-compliant television does not require the user to choose a rendering device because the television would be selected by default. These steps are substantially similar to the standard protocol defined for UPnP Audio and Video (AV) playback. Therefore, a typical media management and control application merely implements the standard protocols defined in the UPnP specification and/or the DLNA specification. The control point application typically automates some tasks, such as, for example, generating and displaying a multiple choice list of relevant devices. However, browsing media often involves manual browsing through the media directories on a particular server. Thus, selection of media may not be efficient, intuitive or enjoyable to the user. The typical control point application does not provide a user-friendly means to create compilations.

A media management application is typically a PC application used to manage a collection of media stored on the PC. Examples of the media management application are iTunes (registered trademark of Apple Computer, Inc.) and SimpleCenter (registered trademark of Universal Electronics, Inc.). The media management application presents a user interface ("UI") which allows the user to browse the media collection, search the media collection using metadata tags associated with the media objects, create and manage compilations of media objects, and directly consume media on the PC which runs the application. The media management application may have DLNA server capabilities; for example, SimpleCenter has a DLNA compliant server. The media management application may allow the user to transfer selected media to portable media players and other similar devices.

However, a limitation of the typical media management application is that use of the media management application is limited to local media which is resident to and/or is accessible by the PC which runs the media management application. The typical media management application is not designed to organize, search, manage, or operate media which may be distributed across numerous DLNA compliant servers throughout the home network. Furthermore, the compilation objects created by and/or managed by the typical media management application may be limited to referencing media objects which are resident to and/or accessible by the PC which runs the media management application. The media management application may not be capable of creating a compilation object which combines media objects distributed across different servers in the home network.

The typical media management application provides an effective UI for editing and managing compilations. However, another limitation of the typical media management application is that the media management application requires the user to create and save a compilation object so that the compilation object may be used to specify media to be sent to a selected rendering device. However, the user may wish to associate media objects for immediate consumption and direct the resulting list of media objects to the rendering device without the need to save a permanent compilation object such as an audio playlist. For example, the user may wish to associate media objects for immediate consumption based on a current preference of the user. If the user is merely arranging the media objects for current consumption, the media management application requirement that the user create and save the compilation object is disadvantageous. The compilation object occupies disk space and space on the display, and the compilation object may have no future relevance to the user.

Because existing media management applications are limited to managing the local media which is resident to and/or is accessible by the PC which runs the media management application, the user may need to operate several copies of the media management application on different PCs located in different areas of the home. The several copies of the media management application on different PCs allow the user to locally manage each sub-collection of media. However, each of the several copies of the media management application usually do not recognize each other and/or do not communicate between one another. A lack of recognition and/or communication between the several copies of the media management application is disadvantageous for the user. For example, the user of one copy of the media management application may not be able to access, edit, manage and/or use compilation objects which were created by and stored locally to a different copy of the media management application. Furthermore, the user of one copy of the media management application may not be able to view a queue of media objects which are in the process of being rendered on a specific rendering device if the queue is initiated by and/or is being managed by a different copy of the media management application.

Another issue for the existing media management applications is management of complexity in the home network. As the media sources and/or the media rendering devices increase in number, tracking and controlling transmission of media from multiple sources to multiple different devices may be increasingly difficult for the user. A functional picture of the entire home network may be difficult for the user to envision. Controlling, managing and/or troubleshooting the entire home network may be difficult as well.

A clear, centralized and intuitive view of the entire home network may allow the user to monitor how media is transmitted between devices. Thus, the user may observe the vitality of the network, and the user may easily modify how media is transmitted between the devices. For example, the view of the entire home network may allow the user to duplicate an existing media stream to be played back simultaneously on multiple rendering devices. As a further example, the view of the entire home network may allow the user to easily and intuitively switch an active media stream from a first rendering device to a second rendering device. Typical media management and control applications do not provide the view of the entire home network. A network view is provided in some home network configuration tools, such as, for example, the EasyLink Advisor tool from Linksys, a division of Cisco, Inc. However, these existing home network configuration tools are not focused on media and do not indicate how media devices are interacting in the home network. Moreover, the existing home network configuration tools do not provide functionality for controlling media in the home network.

A need, therefore, exists for a system and a method for managing, controlling and/or rendering media in a network. Further, a need exists for a system and a method for managing, controlling and/or rendering media from a collection of digital media files in the network. Still further, a need exists for a system and a method for managing, controlling and/or rendering media in a network that allow a user to browse, search, manage and/or consume content from multiple storage devices and/or servers in the network. Still further, a need exists for a system and a method for managing, controlling and/or rendering media in a network that allow a user to view the network in its entirety. Still further, a need exists for a system and a method for managing, controlling and/or rendering media in a network that allow a user to view, control and/or modify media connections between devices in the network. Still further, a need exists for a system and a method for managing, controlling and/or rendering media in a network that allow multiple copies of an Enhanced Media Management application to communicate with each other. Moreover, a need exists for a system and a method for managing, controlling and/or rendering media in a network that allow multiple copies of an Enhanced Media Management application to provide identical views of the home network, compilation objects, rendering queues, and/or other data which are managed by the multiple copies of the Enhanced Media Management application.

SUMMARY OF THE INVENTION

The present invention generally relates to a system and a method for managing, controlling and/or rendering media in a network. More specifically, the present invention relates to a system and a method that utilizes a media management application to manage, control and/or render media from a collection of digital media files in the network. The system and the method allow a user to browse, search, manage and/or render content from multiple storage devices and/or servers in the network. The user may view a visual representation of active media connections between the available servers and/or the available rendering devices connected to the network.

To this end, in an embodiment of the present invention, a method for managing media in a network is provided. A terminal, a plurality of rendering devices, and a plurality of media servers are connected to the network. Each media server of the plurality of media servers stores media files. The method has the steps of displaying a first plurality of icons wherein each icon of the first plurality of icons represents one of the media servers wherein the terminal displays the first plurality of icons; displaying a second plurality of icons wherein each icon of the second plurality of icons represents one of the rendering devices wherein the terminal displays the second plurality of icons; displaying a first graphic representation in a first position which extends from a first point adjacent to a first icon of the first plurality of icons to a second point adjacent to a second icon of the second plurality of icons wherein the first icon represents a first media server of the plurality of media servers wherein the second icon represents a first rendering device of the plurality of rendering devices and further wherein the first graphic representation indicates transmission of a first media file from the first media server to the first rendering device wherein the terminal displays the first graphic representation.

In an embodiment, the method has the steps of modifying the first graphic representation to extend from the first point adjacent to the first icon to a third point adjacent to a third icon wherein the third icon represents a second rendering device of the plurality of rendering devices wherein a user input accepted by the terminal modifies the first graphic representation by moving a termination point of the first graphic representation from the second point adjacent to the second icon to the third point adjacent to the third icon; stopping transmission of the first media file from the first media server to the first rendering device wherein the transmission is stopped in response to the modification of the first graphic representation; and transmitting the first media file from the first media server to the second rendering device wherein the first media file is transmitted to the second rendering device in response to the modification of the first graphic representation.

In an embodiment, the method has the steps of creating a second graphic representation associated with the first graphic representation wherein the second graphic representation is created based on a first user input accepted by the terminal which requests duplication of the first graphic representation and further wherein the first graphic representation and the second graphic representation are displayed simultaneously; connecting the second graphic representation to a third icon wherein the third icon represents a second rendering device of the plurality of rendering devices wherein a second user input accepted by the terminal connects the second graphic representation to the third icon; and transmitting the first media file from the first media server to the second rendering device in response to connection of the second graphic representation to the third icon wherein the first rendering device and the second rendering device provide synchronized playback of the first media file.

In an embodiment, the first graphic representation and the second graphic representation are identical in appearance.

In an embodiment, the first graphic representation is graphically unique from another graphic representation simultaneously displayed on the terminal.

In an embodiment, the first graphic representation is color-coded.

In an embodiment, the method has the step of displaying a second graphic representation in a second position which extends from a third point adjacent to a third icon of the first plurality of icons to a fourth point adjacent to a fourth icon of the second plurality of icons wherein the third icon represents a second media server of the plurality of media servers wherein the fourth icon represents a second rendering device of the plurality of rendering devices and further wherein the second graphic representation indicates transmission of a second media file from the second media server to the second rendering device.

In an embodiment, the method has the step of creating the second graphic representation in response to a first user input accepted by the terminal which requests the second graphic representation wherein the second graphic representation is different than the first graphic representation.

In an embodiment, the method has the step of displaying the first graphic representation and the second graphic representation simultaneously.

In an embodiment, the first graphic representation and the second graphic representation are graphically distinguishable. In an embodiment, the method has the steps of accepting a user input on the terminal wherein the user input requests deletion of the first graphic representation; deleting the first graphic representation in response to the user input; and stopping transmission of the first media file from the first media server to the first rendering device wherein the transmission is stopped in response to the deletion of the first graphic representation.

In an embodiment, the method has the steps of accepting a user input on the terminal wherein the user input selects the first graphic representation; and displaying a preview of the first media file wherein the preview of the first media file is displayed in a user interface provided by the terminal wherein the terminal displays the preview of the first media file in response to the selection of the first graphic representation and further wherein the first media file is simultaneously rendered by the first rendering device.

In an embodiment, the method has the step of graphically flagging the first graphic representation to indicate a problem with the transmission of the first media file from the first media server to the first rendering device.

In an embodiment, the method has the step of graphically flagging the first graphic representation to indicate that the transmission of the first media file from the first media server to the first rendering device is in a paused state.

In an embodiment, the method has the steps of highlighting an icon in response to a first user input accepted by the terminal wherein the icon represents one of the plurality of media servers; and displaying information about the one of the plurality of media servers wherein the terminal displays the information in response to highlighting the icon.

In an embodiment, the method has the step of highlighting an icon in response to a first user input accepted by the terminal wherein the icon represents one of the plurality of rendering devices; and displaying information about the one of the plurality of rendering devices wherein the terminal displays the information in response to highlighting the icon.

In an embodiment, the method has the step of using UPnP Control Point protocols to determine that the plurality of rendering devices and the plurality of media servers are connected to the network.

In an embodiment, a system for managing media in a network is provided. The system has a first terminal and a first rendering device connected to the network. A second rendering device is connected to the network wherein the first rendering device and the second rendering device are different rendering devices. A first server is connected to the network wherein the first server stores a first plurality of media files. A second server is also connected to the network wherein the second server stores a second plurality of media files. The first server and the second server are different servers. The system has a first set of icons which represent available servers connected to the network and accessible through the network. The first set of icons includes a first icon which corresponds to the first server and a second icon which corresponds to the second server. The system also has a second set of icons which represent available rendering devices connected to the network. The second set of icons includes a third icon which corresponds to the first rendering device and a fourth icon which corresponds to the second rendering device. The first terminal displays the first set of icons and the second set of icons simultaneously. A first media file of the first plurality of media files from the first server is transmitted to and played on the first rendering device. The system further has a graphic representation displayed in a first position which extends from a first point adjacent to the first icon to a second point adjacent to the third icon in response to initiation of transmittal of the first media file from the first server to the first rendering device. The graphic representation indicates transmission of the first media file from the first server to the first rendering device.

In an embodiment, the system has an additional graphic representation which indicates that the third icon and the fourth icon were selected in combination wherein the first rendering device and the second rendering device automatically provide synchronized playback of the first media file in response to user input directing one of the first rendering device and the second rendering device to play the first media file and further wherein the user input is accepted by the terminal after displaying the additional graphic representation.

In an embodiment, the system has a control point element that determines that the plurality of rendering devices and the plurality of media servers are connected to the network.

It is, therefore, an advantage of the present invention to provide a system and a method for managing, controlling and/or rendering media in a network.

Another advantage of the present invention is to provide a system and a method for managing, controlling and/or rendering media that allow digital media files in a network to be accessed from any location in the network.

And, another advantage of the present invention is to provide a system and a method for managing, controlling and/or rendering media in a network that allow a user to browse, search, manage and/or consume content from multiple storage devices and/or servers in the network.

Yet another advantage of the present invention is to provide a system and a method for managing, controlling and/or rendering media in a network that remove the need for the user to know which media objects are stored on which server of the network.

Still further, an advantage of the present invention is to provide a system and a method for managing, controlling and/or rendering media in a network that allow a user to create, edit, manage and/or use compilation objects which reference media files distributed across multiple storage devices and/or multiple servers connected to the network.

And, another advantage of the present invention is to provide a system and a method for managing, controlling and/or rendering media in a network that aggregate digital media files from different sources.

Yet another advantage of the present invention is to provide a system and a method for managing, controlling and/or rendering media in a network that allow the user to assemble a temporary compilation for immediate consumption without the need to create, save, and/or manage a permanent compilation object.

Still further, an advantage of the present invention is to provide a system and a method for managing, controlling and/or rendering media in a network that allow multiple copies of an Enhanced Media Management application to communicate with each other.

And, another advantage of the present invention is to provide a system and a method for managing, controlling and/or rendering media in a network that allows a user to control rendering devices remotely.

Still further, an advantage of the present invention is to provide a system and a method for managing, controlling and/or rendering media in a network that allow multiple copies of an Enhanced Media Management application to provide identical views of the home network, compilation objects, rendering queues, and/or other data which are managed by the multiple copies of the Enhanced Media Management application.

Another advantage of the present invention is to provide a system and a method for managing, controlling and/or rendering media in a network that provide a functional view of media-enabled devices in the network.

Yet another advantage of the present invention is to provide a system and a method for managing, controlling and/or rendering media in a network that allow a user to control how media is transmitted in the network.

Moreover, an advantage of the present invention is to provide a system and a method for managing, controlling and/or rendering media in a network that allow a user to manage, control and/or consume media in a home network.

Additional features and advantages of the present invention are described in, and will be apparent from, the detailed description of the presently preferred embodiments and from the drawings.

BRIEF DESCRIPTION OF THE DRAWINGS

FIG. 5 illustrates an Active Devices sub-view of a Network View of an EMMA in an embodiment of the present invention.

FIG. 6 illustrates a Connections sub-view of a Network View of an EMMA in an embodiment of the present invention.

FIG. 7 illustrates a system for managing, controlling and/or rendering media in a network in an embodiment of the present invention.

FIG. 8 illustrates a flowchart for managing, controlling and/or rendering media in a network in an embodiment of the present invention.

DETAILED DESCRIPTION OF THE PREFERRED EMBODIMENTS

The present invention generally relates to a system and a method for managing, controlling and/or rendering media in a network. More specifically, the present invention relates to a system and a method that utilize a media management application to manage, control and/or render media from a collection of digital media files in the network. The system and the method allow a user to browse, search, manage and/or render content from multiple storage devices and/or servers in the network. The user may view a visual representation of active media connections between the available servers and/or the available rendering devices connected to the network.

The system and the method allow the user to control use of media in the network; for example, the user may pause or resume rendering on a specific rendering device, may stop and/or may clear a queue for a specific rendering device, may switch rendering of the current media from one rendering device to a different rendering device, and/or may duplicate and/or may copy the current media from one rendering device to one or more additional rendering devices.

Figure 1:
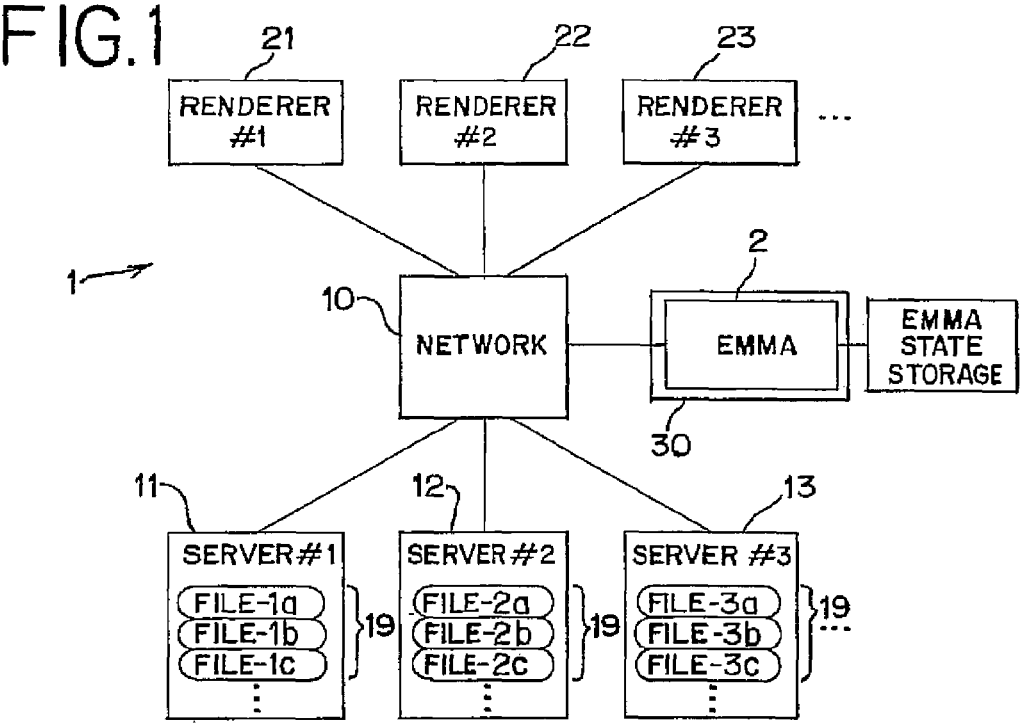
FIG. 1 illustrates a system for managing, controlling and/or rendering media in a network in an embodiment of the present invention.

Referring now to the drawings wherein like numerals refer to like parts, FIG. 1 generally illustrates a system 1 for managing, controlling and/or rendering media in a network. The system 1 may have an Enhanced Media Management Application 2 (hereinafter "EMMA 2") which may allow a user to access, manage, organize and/or consume digital media files which are distributed throughout a network 10. A first server 11, a second server 12 and/or a third server 13 (collectively "the servers 11, 12, 13") may be connected to the EMMA 2 by the network 10. A first rendering device 21, a second rendering device 22 and/or a third rendering device 23 (collectively "the rendering devices 21, 22, 23") may be connected to the EMMA 2 by the network 10. In a preferred embodiment, the network 10 may be a home network. The network 10 may have connections that are wired or wireless. The network 10 may be based on one or more of the following technologies: Ethernet/wired LAN, IEEE 1394 ("Fire Wire") and/or IEEE 802.11 ("WiFi"). The network 10 may utilize other technologies not listed herein. The present invention is not limited to a specific embodiment of the network 10.

The servers 11, 12, 13 and/or the rendering devices 21, 22, 23 may be compliant to DLNA standards and/or UPnP AV standards. The system 1 may have at least one server and at least one rendering device, but the system 1 does not have an upper limit to a number of servers and/or a number of rendering devices which may be accessible via the network 10. The present invention is not limited to a specific number of servers and/or rendering devices.

Each of the servers 11, 12, 13 may be, for example, a personal computer ("PC") which may have software which may implement a DLNA-compliant AV Server; a Network Attached Storage ("NAS") device which may have DLNA-compliant AV server capability; a Digital Video Recorder ("DVR") which may have DLNA-compliant AV server capability; a portable computing device, such as a mobile telephone or a Personal Digital Assistant ("PDA"), which may have DLNA-compliant AV server capability; and/or a media capture device, such as a digital still camera or a camcorder, which may have DLNA-compliant AV server capabilities. The present invention is not limited to a specific embodiment of the servers 11, 12, 13.

Each of the rendering devices 21, 22, 23 may be, for example, a DLNA-compliant television; a DLNA-compliant set-top box connected to a television which may or may not be DLNA-compliant; a DLNA-compliant Stereo System; a DLNA-compliant audio adapter device connected to a stereo which may or may not be DLNA-compliant; a PC which may have media player software which may have DLNA-compliant rendering capability; a portable computing device, such as, for example, a mobile telephone or a Personal Digital Assistant ("PDA"), which may have DLNA-compliant rendering capability; a DLNA-compliant photo display frame; and/or a video game console which may have UPnP technology. The present invention is not limited to a specific embodiment of the rendering devices 21, 22, 23.

Each of the servers 11, 12, 13 may have digital media files 19 which may be provided to the rendering devices 21, 22, 23. The digital media files 19 may be simple media objects, such as, for example, a video clip, a music track and/or a digital photograph, may be pre-defined composite objects, such as, for example, a television series and/or a music album, and/or may be compilation objects which the user has previously defined, such as, for example, a music playlist and/or a photo slide show. The present invention is not limited to a specific embodiment or type of the digital media files 19.

The EMMA 2 may connect to the servers 11, 12, 13 and/or the rendering devices 21, 22, 23 via the network 10 to access, manage and/or organize the digital media files 19 which may be available on the servers 11, 12, 13. The EMMA 2 may connect to the servers 11, 12, 13 and/or the rendering devices 21, 22, 23 via the network 10 to control how the digital media files 19 may be transferred from the servers 11, 12, 13 to the rendering devices 21, 22, 23 for consumption. The EMMA 2 may act as a standard UPnP AV Control Point. The EMMA 2 may have local rendering capability that may allow the user to directly preview and/or consume media files from an EMMA user interface. The network 10 may have one of the EMMA 2, or may have multiple copies of the EMMA 2 as described in further detail below.

The network 10 may have one or more of an additional standard DLNA/UPnP Control Point (not shown) which may be distributed throughout the network 10. The additional standard DLNA/UPnP Control Point may not have enhanced functionalities of the EMMA 2. For example, the additional standard DLNA/UPnP Control Point may be embedded in one of the rendering devices 21, 22, 23 and/or may be associated with one of the servers 11, 12, 13. The additional standard DLNA/UPnP Control Point may be a stand-alone control point, such as, for example, a dedicated DLNA/UPnP control point device and/or a standard DLNA/UPnP Control Point operating on a PC or on a portable computing device.

The EMMA 2 may be a software application which may operate on a device 30 which may be connected to the network 10. The device 30 may be capable of running software and/or may be capable of presenting an interactive visual user interface ("UI") to the user. For example, the device 30 that supports the EMMA 2 may be a desktop PC, a laptop PC, a PDA, a mobile telephone, a "remote control" device, a network-capable television, a network-capable set-top box, a network-capable stereo system that may have a user interface screen, and/or a network-capable audio adapter device that may have a user interface screen. If the device 30 is the network-capable set-top box, the interactive visual UI may be displayed via a television attached to the set-top box. The network 10 may have more than one of the devices 30 that may have the EMMA 2. The present invention should not be limited to a specific embodiment of the device 30 that may have the EMMA 2.

Figure 2:
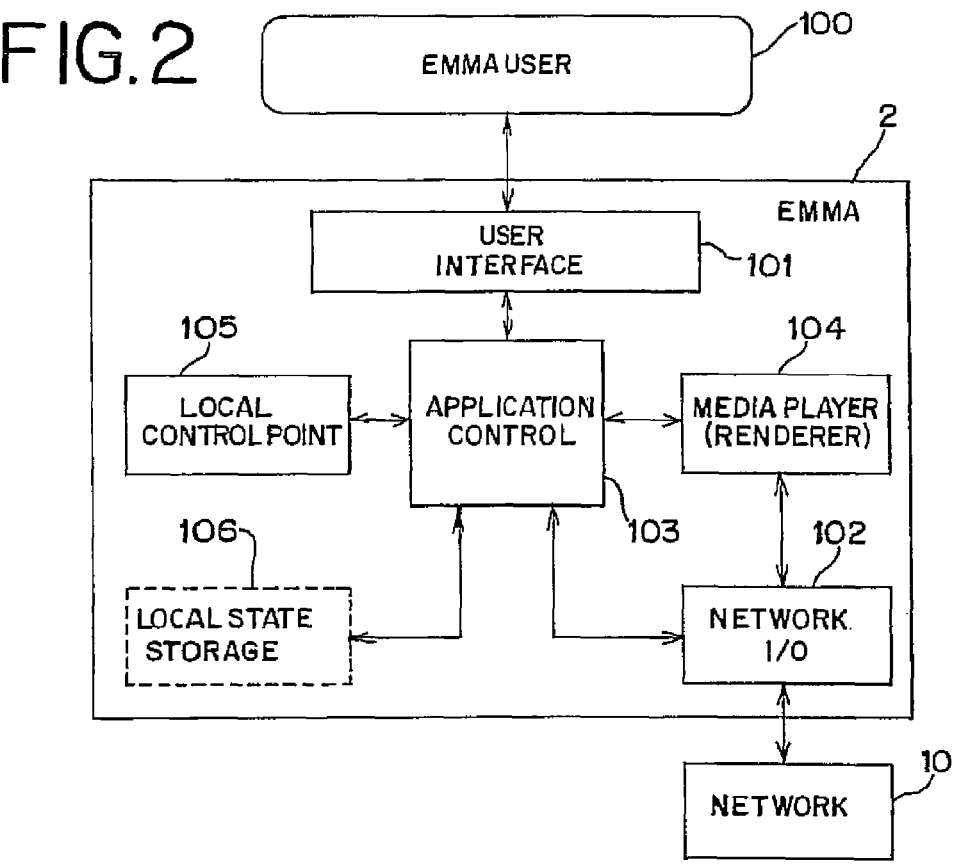
FIG. 2 illustrates an Enhanced Media Management Application ("EMMA") in an embodiment of the present invention.

FIG. 2 generally illustrates a black-box diagram of the EMMA 2. The EMMA 2 may present the interactive visual UI 101 to the user on a display screen and/or may solicit user input to control the EMMA 2. The method of user input may vary depending on the device 30 on which the EMMA 2 may be operating. For example, the user 100 may control the EMMA 2 using one or more of the following devices: a pointing device, such as, for example, a mouse trackball and/or a trackpad; a joystick; a 4-way navigation key; a touchscreen; a set of programmable "soft keys"; and/or a set of physical buttons, such as, for example, a computer keyboard, a mobile telephone keypad, a series of buttons on the "remote control" associated with a television or set-top box and/or the like. The "soft keys" may be buttons which may perform a function dependent on text shown on the display screen adjacent to the buttons. The present invention is not limited to a specific embodiment of the device for controlling the EMMA 2.

As previously set forth, the EMMA 2 may present the user 100 with the interactive visual UI 101. The interactive visual UI 101 may allow the user 100 to recognize, organize and/or manage the digital media files 19 in the network 10. Further, the interactive visual UI 101 may allow the user 100 to create, edit, manage and/or use compilation objects which may be compilations of digital media files 19. Still further, the interactive visual UI 101 may allow the user 100 to control transfer of the digital media files 19 from the servers 11, 12, 13 to the rendering devices 21, 22, 23. Still further, the interactive visual UI 101 may allow the user 100 to preview and/or consume one of the digital media files 19 on the EMMA 2. Still further, the interactive visual UI 101 may allow the user 100 to view a state of media delivery and/or rendering in the network 10 and/or use a view of the state of media delivery and/or rendering to control the transfer of digital media files 19. Moreover, the interactive visual UI 101 may allow the user 100 to set preferences associated with the EMMA 2.

The EMMA 2 may be attached to the network 10 via a "Network I/O" element 102. The EMMA 2 may have a central "Application Control" element 103 which may implement logic and/or control as described in further detail below. The EMMA may have a local media player 104 which may act as a rendering device. The user 100 may use the interactive visual UI 101 to preview and/or consume media directly through the local media player 104 of the EMMA 2. The local media player 104 may request and/or may receive media for rendering via the "Application Control" element 103 and/or directly via the "Network I/O" element 102.

The EMMA 2 may have and/or may operate a local Control Point 105 which may support standard UPnP Control Point protocols. The EMMA 2 may use the local Control Point 105 to determine availability and/or capability of the servers 11, 12, and/or the rendering devices 21, 22, 23 connected to the network 10. Further, the EMMA 2 may use the local Control Point 105 to query the servers 11, 12, 13 to determine appropriate content on each of the servers 11, 12, 13. Still further, the EMMA 2 may use the local Control Point 105 to present Uniform Resource Locators ("URLs") for the appropriate content to the rendering devices 21, 22, 23 to initiate and/or control rendering of content.

The EMMA 2 may have a Local State Storage element 106 in which the state of the local EMMA 2 may be stored. The Local State Storage element 106 may have stored compilation objects that may be created and/or managed by the local EMMA 2. In addition, the Local State Storage element 106 may have temporary compilation objects which may be in the process of being created, edited and/or used by the EMMA 2. Also, the Local State Storage element 106 may have a detailed state of one or more rendering queues which may be created by and/or may be managed by the local EMMA 2.

For each of the rendering queues, the detailed state may identify which of the rendering devices 21, 22, 23 may be receiving the rendering queue. Further, the detailed state may have a list of content URLs for content objects currently in the rendering queue. Still further, the detailed state may have associated metadata, such as, for example, a title, an author, a rating and/or the like for each of the content URLs. Still further, the detailed state may indicate a current position in the queue which may indicate which content object is currently being rendered. Still further, the detailed state may identify an approximate time offset which may indicate rendering progress of the content object. The present invention is not limited to a specific embodiment of the detailed state of the rendering queue.

The Local State Storage element 106 may have additional EMMA configuration and/or user preference information. As an alternative to the Local State Storage element 106, the EMMA 2 may store, may update and/or may maintain information in a global state storage area which may be accessible via the network 10 as described in further detail below.

The EMMA 2 may provide the user 100 with a Search View, a Workspace View and/or a Network View. The Search View may allow the user 100 to view a list and/or an iconic representation of the available servers 11, 12, 13. The user 100 may select content filters that may restrict the content objects to a particular media type and/or may restrict a server list to a particular subset of the available servers 11, 12, 13. The user 100 may initiate content browsing and/or searching using the restrictions imposed by the selected content filters.

The Workspace View may allow the user 100 to browse and/or explore content returned by a search initiated from the Search View. The user 100 may adjust search terms and/or the content filters to change and/or improve results of the search. The user 100 may organize and/or may assemble the content returned by the search into a compilation object using an Editing Pane. The user 100 may use the Editing Pane of the Workspace View to access saved compilation objects for using, editing, managing or deleting the saved compilation objects.

The user 100 may use the Workspace View to import compilation objects which may have been created outside of the EMMA 2. The Workspace View may provide the user 100 with a list and/or an iconic representation of the available rendering devices 21, 22, 23.

The user 100 may direct any simple media object, any stored compilation object, any pre-defined composite object, such as a music album, and/or current contents of the Editing Pane to any of the available rendering devices 21, 22, 23. Visual feedback to the user 100 may indicate success or failure of a requested rendering operation. If the EMMA 2 has a local media player 104, then the user 100 may use the Workspace View to play media. In this case, the user 100 may use the interactive visual UI 101 to preview and/or consume the media using the local media player 104. For example, the media previewed and/or consumed using the local media player 104 may be the simple media object, the stored compilation object, the pre-defined composite object and/or the current contents of the Editing Pane.

The Network View may allow the user 100 to view a list and/or an iconic view of the servers 11, 12, 13 and/or the rendering devices 21, 22, 23 connected to the network 10. Using the Network View, the user may choose and/or may switch between an Active Devices Sub-View and a Connections Sub-view. The Active Devices Sub-View may allow the user 100 to view a list and/or an iconic view of active rendering devices connected to the network 10.

The list and/or the iconic view of the Active Devices Sub-View may display information for each of the active rendering devices. For example, the list and/or the iconic view of the Active Devices Sub-View may display a title of a current media object rendered on each of the active rendering devices. Further, the list and/or the iconic view may display additional metadata associated with the current media object rendered on each of the active rendering devices, such as, for example, an artist, a rating, a recording date, an associated music album and/or the like. Still further, for each of the active rendering devices, the list and/or the iconic view may indicate the rendering progress of the current media object rendered. Still further, the list and/or the iconic view may display a name of a media object which is rendered on each of the active rendering devices. The name of the composite object may be, for example, a music album name, and/or a name of the compilation object may be, for example, a playlist name. Still further, for each of the active rendering devices, the list and/or the iconic view may display a current rendering queue which may be expressed as a list of media objects which have not been rendered on a specific active rendering device.

The list and/or the iconic view may display a subset of the information. The user may be required to highlight one of the active rendering devices to view some or all of the information. For example, the information may not be displayed simultaneously for all of the active rendering devices. Basic information, such as, for example, the title of the current media object rendered and/or the rendering progress, may be displayed for each of the active rendering devices. Display of the basic information may allow the user 100 to select a specific active rendering device to view additional details about the specific active rendering device.

If the EMMA 2 has the local rendering capability, then the user 100 may select and/or may highlight the specific active rendering device to view, listen to, and/or monitor media which may be playing on the specific active rendering device. The user 100 may use the local rendering capability of the EMMA 2 to view, listen to, and/or monitor the media. The EMMA 2 may provide media controls such as, for example, "Pause," "Play," "Rewind," "Fast Forward" and/or "Stop" which may be accessible via the interactive visual UI 101 of the EMMA 2. In this case, a playback position on the local media player 104 and/or a playback position on the specific active rendering device may be identically controlled and/or identically adjusted using the media controls.

The Connections Sub-view may display a graphical representation of the available servers and/or the available rendering devices connected to the network 10. The Connections Sub-view may provide a visual indication of active media connections between the available servers and the available rendering devices. The user 100 may select and/or may highlight a specific active rendering device to view the details of the specific active rendering device as set forth for the Active Devices Sub-View.

The user 100 may also use the Connections Sub-View to obtain a visual indication of a problem with media transfer in the network 10, such as, for example, an indication that a specific requested media connection is not functioning correctly. The user 100 may also use the Connections Sub-View to re-route and/or duplicate the media, such as the current media object rendered and/or additional media objects in the rendering queue. The media may be re-routed and/or duplicated from one of the active rendering devices to a different one of the active rendering devices. Duplicating the media may specify that the media be played simultaneously on two or more of the indicated rendering devices 21, 22, 23. Duplicating the media for simultaneous play is known to one skilled in the art as a "party mode" configuration.

Figure 3:
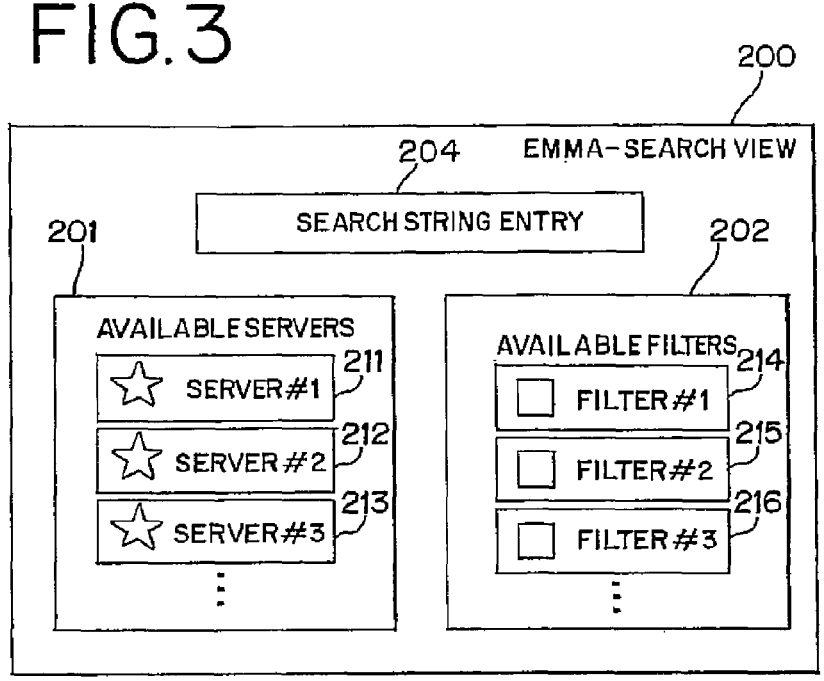
FIG. 3 illustrates a Search View of an EMMA in an embodiment of the present invention.

FIG. 3 generally illustrates the Search View 200 of the EMMA 2. The Search View 200 may display a list 201 of available servers. For example, if the first server 11, the second server 12 and/or the third server 13 are available, the list 201 of available servers may display a first server icon 211, a second server icon 212 and/or a third server icon 213, respectively, to indicate server availability. The EMMA 2 may determine the list 201 of the available servers automatically using a standard UPnP Discovery process. The user 100 may use the list 201 of the available servers to select and/or highlight one or more of the available servers to restrict a content search to a subset of the available servers.

The Search View 200 may display a list 202 of available filters which may be used to filter the content and/or restrict the content search. For example, the list 202 of the available filters may have specific media types, such as, for example, audio content, video content, digital still photos and/or a combination of two or more specific media types. As another example, the list 202 of the available filters may have specific genres, such as, for example, comedy, drama, sports, classical, jazz, heavy metal and/or the like. As yet another example, the list 202 of the available filters may have specific ratings, such as, for example, a number of stars on a "five-star" rating scale, a number rating on a scale of one to ten, and/or the like. The list 202 of the available filters may indicate which filters are available by displaying a first filter icon 214 that may represent a first available filter, a second filter icon 215 that may represent a second available filter and/or a third filter icon 216 that may represent a third available filter. The available filters may be displayed and/or selected using other well-known user interface means. For example, the list 202 of the available filters may be displayed as a "check-box" list, may be selected from a "drop-down" menu, and/or the like. The present invention is not limited to a specific embodiment of display of the list 202 of the available filters.

Figure 4:
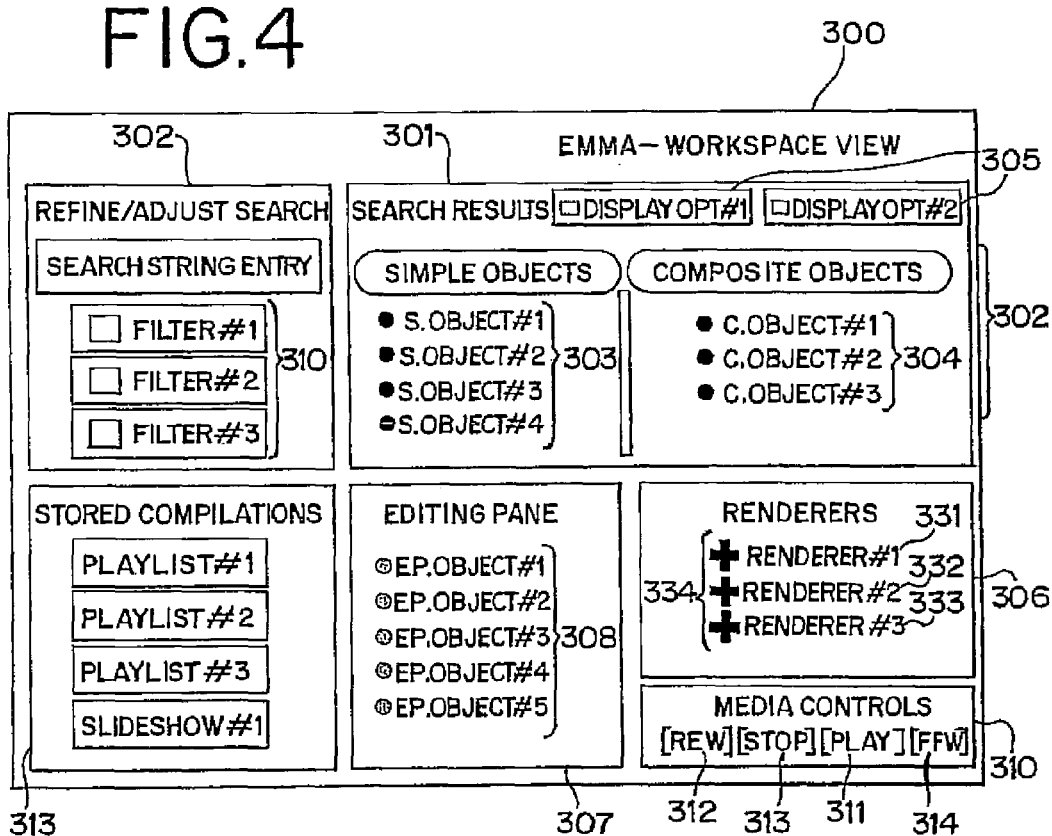
FIG. 4 illustrates a Workspace View of an EMMA in an embodiment of the present invention.

The user 100 may select one or more of the available servers and/or one or more of the available filters and then may type text into a Search String Entry area 204. The EMMA 2 may execute standard DLNA content queries in the subset of the available servers. If no subset is selected by the user 100, the EMMA 2 may execute standard DLNA content queries in the available servers. The EMMA 2 may filter search results based on the selected content filters to generate filtered search results. The EMMA 2 may aggregate the filtered search results into a single set of search results which may represent the filtered search results across a full subset of the selected available servers. The EMMA 2 may transition to the Workspace View and/or may display the filtered search results in a Search Results area 301 of the Workspace View 300 as generally shown in FIG. 4.

Referring again to FIG. 3, content query operations performed by the EMMA 2 may vary depending upon the specific embodiment of the present invention. For example, in one embodiment, the EMMA 2 may be associated with a specific server that may be connected to the network 10, and/or the EMMA 2 may have direct access to a content database resident on the specific server. In this case, the EMMA 2 and the specific server with which the EMMA 2 is associated may reside on the same device, or the EMMA 2 may have a direct high-speed connection to a device on which the specific server resides. The EMMA 2 may not need to connect to the specific server via the network 10 and/or may have an alternate means of obtaining content query results from the specific server.

In an embodiment, the EMMA 2 may perform periodic background queries to construct and/or maintain an internal database of information. For example, the EMMA 2 may perform the periodic background queries during periods of inactivity. The internal database of information may have information about digital media files which may be available via the network 10. In this case, the EMMA 2 may not need to perform real-time queries if the user 100 requests a content search, and/or the EMMA 2 may obtain necessary information from the internal database of information. The present invention should not be limited to a specific method for obtaining content query results.

Rather than conduct a text search, the user 100 may select one of the available servers from the list 201 of the available servers for direct browsing. The EMMA 2 may obtain results from a query of a selected server, may filter the results using any filters which may have been selected by the user 100, and/or may transition to the Workspace View 300. A filtered search result may be displayed in the Search Results area 301 of the Workspace View 300 as generally shown in FIG. 4. The EMMA 2 may provide a navigation function by which the selected server may be manually browsed from the Workspace View 300. For example, the user 100 may navigate a directory hierarchy from within the Search Results area 301 of the Workspace View 300. Content viewed by navigating the directory hierarchy may be continuously filtered by the selected filters. However, the Workspace View 300 may allow modification of the selected filters using a filter selection option which may be presented in a Refine/Adjust Search area 302 of the Workspace View 300. Search results 320 may be displayed in the Search Results area 301. The search results 320 may be limited to a selected subset of the available servers. The search results 320 may be further restricted by the content filters 310 which the user 100 may have selected. The search results 320 may have simple media objects 303, such as, for example, video clips, music tracks and/or digital photographs, as well as pre-defined composite media objects 304, such as, for example, music albums. The Search Results area 301 may provide various display options 305 which may be selected by the user 100. For example, the display options 305 may limit displayed results to content of a specific type, such as, for example, audio or video, limit the displayed results to content which may fall under specific genre tags, and/or may limit the displayed results to content which may be considered "Popular" or "Highly Rated." Filtering of the content based on the display options may be performed on the search results as a post-processing step. Therefore, the user 100 may switch between the various display options 305. Switching between the various display options 305 may update the Workspace View 300 and/or may not require transmission of a search query over the network 10.

The Workspace View 300 of the EMMA 2 may display the Refine/Adjust Search area 302. Using the Refine/Adjust Search area 302, the user 100 may change the content filters 310 and/or may modify an original search without navigating to the Search View 200. The user 100 may select from among the available content filters and/or may modify the search text in the Search String Entry area 315. The EMMA 2 may then query the available servers and/or review the internal database to generate a modified search result. The EMMA 2 may update the search results displayed in the Search Results area 301 accordingly.

The simple media objects 303 and/or the composite media objects 304 displayed in the Search Results area 301 of the Workspace View 300 may be used in other areas of the Workspace View 300. For example, the user 100 may select any of the simple media objects 303 and/or the composite media objects 304 from the Search Results area 301. The user 100 may direct the simple media object 303 and/or the composite media object 304 to one of the available rendering devices represented in a Renderers area 306. For example, if the first rendering device 21, the second rendering device 22 and/or the third rendering device 23 are available, the Renderers area 306 may display a first rendering device icon 331, a second rendering device icon 332 and/or a third rendering device icon 333, respectively, to indicate rendering device availability. Directing one or more of the simple media objects 303 and/or one or more of the composite media objects 304 to an icon associated with a selected rendering device may render the simple media object 303 and/or the composite media object 304 on the selected rendering device. For the composite media object 304, an ordered list of simple media objects which form the composite media object 304 may be rendered on the selected rendering device.

As another example, the user 100 may copy the simple media objects 303 and/or the composite media objects 304 from the Search Results area 301 into an Editing Pane 307 of the Workspace View 300. The Editing Pane 307 may allow the user 100 to construct user-defined compilation objects 308, such as, for example, music playlists, digital photo slideshows and/or the like.

As yet another example, the user 100 may select the simple media object 303 and/or the composite media object 304 in the Search Results area 301, in the Editing Pane 307 and/or elsewhere in the Workspace View 300. The user 100 may preview the selected media object using the "play" function 311 of a Media Controls area 310 of the Workspace Area 300. The EMMA 2 may have a Media Preview area (not shown) in which the media may be previewed. Alternatively, the Media Preview area may appear in the Workspace View 300 if the "play" function 308 is selected. A preview of the media may be controlled using various functions of the Media Controls area 310, such as, for example, "rew" 312 to rewind, "stop" 313, "play" 311 to play or pause, and/or "ffw" 314 to fast forward.

The Editing Pane 307 may allow the user 100 to create and/or edit an ordered list of media objects. The Editing Pane 307 may be blank initially, and the user 100 may clear the Editing Pane 307 at any time. Moving the simple media objects 303 and/or the composite media objects 304 from the Search Results area 301 into the Editing Pane 307 may cause the EMMA 2 to create a new compilation object. The new compilation object may initially have the simple media objects 303 and/or the composite media objects 304 which were moved into the Editing Pane 307. The user 100 may then proceed to edit the new compilation object, may add the simple media objects 303 and/or the composite media objects 304 to the new compilation object, and/or may rearrange an order of the media objects in the Editing Pane 307. The user 100 may choose to store the new compilation object in a Stored Compilations area 313, in which case the EMMA 2 may prompt the user 100 to name the new compilation object.

Instead of storing the new compilation object in the Stored Compilations area 313, the user 100 may instead move the new compilation object directly to one of the available rendering devices represented in the Renderers area 306. The EMMA 2 may not prompt the user 100 to name the new compilation object, and the new compilation object may not be saved in the Stored Compilations area 313. Instead, the EMMA 2 may internally manage a temporary copy of the new compilation object and/or may queue contents of the new compilation object on the selected rendering device. If the queue is completely rendered and/or the temporary copy of the new compilation object is no longer needed, the EMMA 2 may delete the temporary copy of the new compilation object. Therefore, the user 100 may arrange the simple media objects 303 and/or the composite media objects 304 for immediate rendering without a need to create, name and/or store a copy of the new compilation object. Instead of creating the new compilation object, the user 100 may edit an existing compilation object from the Stored Compilations area 313. In this case, the EMMA 2 may display contents of the existing compilation object in the Editing Pane 307. The user may edit the existing compilation object, may add the simple media objects 303 and/or the composite media objects 304 from the Search Results area 301, and/or may rearrange the order of the media objects in the Editing Pane 307. The user 100 may move the contents of the Editing Pane 307 to a specific rendering device in the Renderers area 306. The EMMA 2 may queue the contents of the Editing Pane 307 for rendering on the specific rendering device without creating, naming and/or storing a permanent copy of the object in the Stored Compilations area 313.

Alternatively, the user 100 may choose to save the contents of the Editing Pane 307 to the Stored Compilations area 313 using the name of the original compilation object which was initially moved into the Editing Pane. Saving the contents of the Editing Pane 307 to the Stored Compilations area 313 using the name of the original compilation object may be a default setting. The user 100 may provide a new name such that the resulting compilation object may be stored as a new compilation object under the new name and/or without overwriting the original compilation object on which the new compilation object was based.

The Stored Compilations area 313 of the Workspace View 300 may provide additional functions for managing the stored compilation object. The stored compilation object may be deleted, may be duplicated and/or may be directly transmitted to a specific rendering device represented in the Renderers area 306 for rendering. Furthermore, the stored compilation object may be added to the contents of the Editing Pane 307. An ordered list of simple media objects referenced by the compilation object and/or the composite media object may be added to the Editing Pane 307. The ordered list of simple media objects may be added to the Editing Pane 307 at a location in the Editing Pane 307 indicated by the user 100.

A list 334 of the available rendering devices may be displayed in the Renderers area 306 of the Workspace View 300. The list 334 of the available rendering devices may be created through a standard UPnP Device Discovery process. If the EMMA 2 has the local rendering capability, a representation of the local media player 104 may be displayed in the list 334 in the Renderers area 306. Thus, the user 100 may direct the simple media object 303 from the Search Results area 301, the pre-defined composite object 304 from the Search Results area 301, the user-defined compilation object from the Stored Compilations area 313 and/or the current contents of the Editing Pane 307 to one of the available rendering devices in the Renderers area 306 and/or to the local media player 104 as represented as one of the rendering devices in the list 334 of the available rendering devices of the EMMA 2.

The available rendering devices and/or the local media player 104 of the EMMA 2 may be listed and/or shown graphically in the Renderers area 306 and/or may be flagged to indicate that the specific rendering device is currently active. For example, the specific rendering device may be flagged to indicate that the specific rendering device is currently rendering one of the digital media files 19. The user 100 may move an active rendering device to the Editing Pane 307 to view a state of an original rendering queue and/or to modify the original rendering queue to generate an edited rendering queue. If the edited rendering queue is returned to the specific rendering device as depicted in the Renderers Area 306 in the Workspace View 300 after modification in the Editing Pane 307, modifications may be effectuated by the specific rendering device. The specific rendering device may render the contents according to the edited rendering queue. The additional functions of the Editing Pane 307 may also be accessed, such as, for example, the user 100 may save the original rendering queue and/or the edited rendering queue to the Stored Compilations area 313, and/or the user 100 may add contents to the edited rendering queue. The contents may be added to the edited rendering queue from the Search Results area 301 and/or from the Stored Compilations area 313.

The EMMA 2 may allow the user to select two or more rendering devices from the Renderers Area 306 to form a "rendering group." In this case, the rendering devices of the "rendering group" may be linked graphically within the Renderers Area 306. For example, the rendering devices of the "rendering group" may be highlighted in a similar way, may be encircled by a common graphic border and/or may be joined by graphic lines and/or symbols. After the "rendering group" is defined, the EMMA 2 may control each of the rendering devices of the "rendering group" as a single unit. Media directed to the "rendering group" may be played simultaneously on each of the rendering devices of the "rendering group" in the "party mode" configuration. The EMMA 2 may allow the user to define more than one "rendering group" using the available rendering devices represented in the Renderers Area 306.

Using the Search View 200 and/or the Workspace View 300, the user 100 may perform a search of the available servers or a subset of the available servers using optional restrictions which may be defined via the content filters. Using the Search View 200 and/or the Workspace View 300, the user 100 may repeat, modify, refine and/or improve the search to obtain additional search results. Further, using the Search View 200 and/or the Workspace View 300, the user 100 may create, may edit, may manage and/or may use the compilation objects; may use combinations of the current search results and/or a library of stored compilations to arrange content for rendering; may preview content locally using the local media player 104 of the EMMA 2; and may queue content arrangements for rendering on a specific remote rendering device.

After the content has been transmitted to the local media player 104 and/or one or more of the available rendering devices connected to the network 10, the user 100 may navigate to the Network View of the EMMA 2. The Network View 400 is generally illustrated in FIGS. 5 and 6. The Network View 400 may provide a Network Summary area 401, a Detail Info area 402, a Media Preview area 403 and/or a Media Controls area 404. The Network Summary area 401 may display information about available multimedia devices connected to the network 10. The Detail Info area 402 may display additional detailed information about a specific rendering device which may have been selected by and/or may have been highlighted by the user 100. The Media Preview area 403 may be present if the EMMA 2 has the local rendering capability. The Media Controls area 404 may be used to control media playback on the selected rendering device.

The Network View 400 of the EMMA 2 may provide sub-views and/or an option for the user 100 to navigate between the sub-views. A first sub-view may be an Active Devices sub-view 420. A second sub-view may be a Connections sub-view 450. The sub-views may differ only in the type of information which may be displayed in the Network Summary area 401 of the sub-view. The Detail Info area 402, the Media Preview area 403 and/or the Media Controls area 404 may be similar for the sub-views of the Network View 400 of the EMMA 2.

FIG. 5 generally illustrates the Active Devices sub-view 420 of the Network View 400 of the EMMA 2. The Network Summary area 401 of the Active Devices sub-view 420 may be a list and/or an iconic view of all active rendering devices in the network 10. For example, if the first rendering device 21, the second rendering device 22 and/or the third rendering device 23 are active, the Network Summary area 401 of the Active Devices sub-view 420 may display a first rendering device icon 411, a second rendering device icon 412 and/or a third rendering device icon 413, respectively, to indicate rendering device activity. The Network Summary area 401 may have summary information about each of the active rendering devices. The summary information may have a title of a media object which the active rendering device is currently rendering. Further, the summary information may have an indication of rendering progress of the current media object. Still further, the summary information may have additional metadata associated with the current media object, such as, for example, an artist, a genre, a rating, a synopsis and/or the like. Still further, the summary information may have a name of a currently rendered composite object, such as, for example, a music album name, or a name of a currently rendered compilation object, such as, for example, a playlist name.

In FIG. 5, the third rendering device icon 413 is marked in a bold line to generally illustrate an example where the user 100 has selected and/or highlighted third rendering device icon 413 to obtain the additional detailed information about the third rendering device 23. The Detail Info area 402 in the Active Devices sub-view 420 of the Network View 400 may have the additional detailed information associated with the specific rendering device which may be currently selected by and/or highlighted by the user 100. The Detail Info area 402 may have the title of the media object which the active rendering device is currently rendering, the indication of the rendering progress of the current media object, the additional metadata associated with the current media object, and/or the name of the currently rendered composite object or the currently rendered compilation object. In addition, the Detail Info area 402 may have a current rendering queue that may be expressed as a list of media objects which are queued for rendering on the specific active rendering device.

FIG. 6 generally illustrates the Connections sub-view 450 of the Network View 400 of the EMMA 2. The Network Summary area 401 may depict the available servers and/or the available rendering devices connected to the network 10. Thus, the Network Summary area 401 may provide the user 100 with a complete picture of a state of the available multimedia devices connected to the network 10. The Network Summary area 401 of the Connections sub-view 450 may be a list and/or an iconic view of the servers and/or the active rendering devices connected to the network 10. For example, the Network Summary area 401 of the Connections sub-view 450 may display a first server icon 461, a second server icon 462 and/or a third server icon 463 to represent the first server 11, the second server 12 and/or the third server 13, respectively. As an additional example, the Network Summary area 401 of the Connections sub-view 450 may display a first rendering device icon 464, a second rendering device icon 465 and/or a third rendering device icon 466 to represent the first rendering device 21, the second rendering device 22 and/or the third rendering device 23, respectively.

The Connections sub-view 450 may display graphic indications which may provide a representation of media flowing between the servers and the rendering devices. For example, the Connections sub-view 450 may display a first graphic indication 460 of a first media connection between the first server 11 and the third rendering device 23. The Connections sub-view 450 may display a second graphic indication 470 of a second media connection between the third server 13 and the second rendering device 22. The first graphic indication 460 and/or the second graphic indication 470 may be color-coded and/or may be otherwise graphically distinct from each other. Graphically distinguishing media connections from each other may be advantageous if the network 10 has many rendering devices and/or many of the media connections which may cross over one another in the Connections sub-view 450. Moreover, color-coding and/or other graphical distinction may allow association of two or more media connections which represent transfers of the same digital media files. The transfers of identical digital media files may be, for example, media connections which may originate at the same server but which may terminate at different rendering devices to achieve the "party mode" configuration. For example, if the first server 11 has media connections with both the first rendering device 21 and the second rendering device 22 and the media connections are transferring the same digital media files, graphic representations of the media connections may be the same color and/or may be otherwise graphically distinct from other graphic representations of media connections which may be present in the Connections sub-view 450.

An icon that may represent one of the servers 11, 12, 13, one of the rendering devices 21, 22, 23 and/or one of the media connections may be graphically "flagged." A "flagged" icon may indicate problems with one of the multimedia devices, problems with the transmission of the media, and/or pausing of one of the media connections. If one of the media connections is paused, media transmission may be resumed via action from the user 100.

As in the Active Devices sub-view 420, the Connections sub-view 450 may provide a mechanism by which the user 100 may select and/or may highlight an icon representing one of the active rendering devices to obtain the detail information about a selected rendering device. For example, in FIG. 6, the third rendering device icon 466 is marked in a bold line to indicate that the user 100 has selected and/or highlighted the third rendering device icon 466 to obtain the additional detailed information about the third rendering device 23. The Detail Info area 402 in the Connections sub-view 450 of the Network View 400 may have the additional detailed information associated with the specific rendering device which may be selected by and/or may be highlighted by the user 100.

The Connections sub-view 450 of the Network View 400 may allow the user 100 to delete one of the media connections to abort an associated media transmission. Further, the Connections sub-view 450 of the Network View 400 may allow the user 100 to move a termination point of one of the media connections from one rendering device to a different rendering device. Moving the termination point may change which rendering device receives a specific media transmission. The specific media transmission may be queued media objects and/or a media object whose rendering may be in progress. Still further, the Connections sub-view 450 of the Network View 400 may allow the user 100 to duplicate a media connection which terminates at one of the active rendering devices. The user 100 may then assign a termination point for a duplicate copy to a different rendering device. The user 100 may repeat duplication of the media connection to copy the associated media transmission to multiple rendering devices to configure the "party mode" configuration. Still further, the Connections sub-view 450 of the Network View 400 may allow the user 100 to select one of the servers to view the detail information about a specific server. The detail information displayed for the specific server may vary depending on the embodiment of the present invention.

The Active Devices sub-view 420 and the Connections sub-view 450 of the EMMA 2 may share common functionality which may be associated with the Media Preview area 403 and/or the Media Controls area 404. As set forth previously, the Media Preview area 403 and/or the Media Controls area 404 may be common to both sub-views. The user 100 may select a specific rendering device from the Active Devices sub-view 420 and/or the Connections sub-view 450 and/or may select a specific connection from the Connections sub-view 450. A current media transmission associated with the specific rendering device and/or the specific connection may be displayed in the Media Preview area 403 if the EMMA 2 has the local rendering capability.

The user 100 may control the media transmission associated with the specific rendering device and/or the specific connection by using the various functions of the Media Controls area 404. For example, the user 100 may pause, play, rewind and/or fast-forward the media transmission. If the EMMA 2 has the local rendering capability, a corresponding preview of the media may be controlled identically to and/or simultaneously with rendering of the media on the specific rendering device. The corresponding preview of the media may be displayed in the Media Preview area 403.

FIG. 7 generally illustrates a system 700 for managing, controlling and/or rendering media in a network 710 with multiple instances of the EMMA in the network 710. The multiple instances of the EMMA may operate substantially as set forth previously. However, for user convenience, information which may be generated by, may be managed by, may be stored by and/or may be maintained by the various instances of the EMMA may be merged into a common shared state. Thus, the user 100 may view the common shared state regardless of which instance of the multiple instances of the EMMA may be in use.

The network 710 may have a first instance 720 of the EMMA, a second instance 730 of the EMMA and/or a third instance 740 of the EMMA. For example, the first instance 720 of the EMMA may be located on a PC which may be associated with a specific server. The second instance 730 of the EMMA may be located on a network "remote control" which may normally be located in an area, such as a family room, where a primary network-attached television and/or stereo equipment may reside. The third instance 740 of the EMMA may be embedded in a secondary network-capable television in, for example, a bedroom. The present invention should not be limited a specific number and/or specific locations of instances of the EMMA.

If the user 100 creates and/or edits the compilation objects on a specific instance of the EMMA, the user 100 may be able to access, edit, manage and/or use the same compilation objects from the other instances of the EMMA. The user 100 may not need to know which instance of the EMMA manages a specific variant of a stored compilation library because the Stored Compilations area 313 of the Workspace View 300 may be identical for the interactive visual UI 101 of any of the instances of the EMMA.

Furthermore, if the user 100 creates a temporary arrangement of media in the Editing Pane 307 of a specific instance of the EMMA, and the user 100 queues the temporary arrangement of media to a specific rendering device, then one of the instances of the EMMA may act as the local control point. The instance of the EMMA that acts as the local control point may initiate media transmission and/or may monitor progress of rendering for each media object in the queue. The instance of the EMMA 2 that acts as the local control point may initiate rendering of subsequent media objects as required to continue queued playing of the media arrangement on the specific rendering device.

The user 100 may use the interactive visual UI 101 of any instance of the EMMA to view the queue of any available rendering device. The queue and/or a current rendering status of the rendering device may be available from any instance of the EMMA. Thus, the multiple instances of the EMMA may communicate the information to one another so that the multiple instances of the EMMA may provide a common, identical system view to the user 100 regardless of which instance of the EMMA may be used.

The multiple instances of the EMMA may recognize each other using standard UPnP Discovery process and/or an equivalent process. The multiple instances of the EMMA may establish one instance of the EMMA as a master instance and/or the other instances of the EMMA as servant instances. The master instance of the EMMA may maintain the state of the available multimedia devices and/or may update the state of the available multimedia devices based on updates from the servant instances of the EMMA. Methods known to one skilled in the art may be implemented to avoid conflicts in the state of the available multimedia devices due to simultaneous usage of the EMMA 2 by multiple users. For example, if the user 100 chooses to edit a specific compilation object, the master instance of the EMMA 2 may provide the specific compilation object to the instance of the EMMA 2 which may be used to edit the specific compilation object. Other instances of the EMMA 2 may not be permitted to edit and/or save the specific compilation object until the specific compilation object is returned to the master instance of the EMMA 2.

The method may utilize Global State Storage 745. The Global State Storage 745 may be connected to the master instance of the EMMA. If the first instance 720 of the EMMA is the master instance, the Global State Storage 745 may be connected to the first instance 720 of the EMMA as generally illustrated in FIG. 7. The first instance 720 of the EMMA may manage a shared copy of the state of the available multimedia devices. The second instance 730 of the EMMA and/or the third instance 740 of the EMMA may be servants and/or may access information from the Global State Storage 720 using communication with the first instance 720 of the EMMA via the network 710.

Alternatively, the instances of the EMMA in the network 710 may be configured to maintain a shared state of the available multimedia devices in common storage 750 which may be accessible to the instances of the EMMA in the network 710. In this embodiment, conflict between the multiple instances of the EMMA may be avoided by direct and/or indirect signaling between the instances of the EMMA. The master instance of the EMMA may facilitate conflict resolution to prevent the instances of the EMMA from editing and/or saving a specific compilation object until the master instance of the EMMA grants permission to edit and/or to save the specific compilation object. In an alternative embodiment, the master instance of the EMMA may have no special role for the conflict resolution, and/or the multiple instances of the EMMA may resolve conflicts using direct communication with each other via the network 710 or indirect communication by manipulating and/or reading parameters which may be stored in the common storage 750. The conflict resolution may be achieved using one of many available "Mutex" algorithms which are well known in the art. Thus, the instances of the EMMA may access and/or may manage the shared state of the available multimedia devices via connection to the common storage 750 via the network 710, and/or via connection to the Global State Storage 745 via the network 710 and/or the master instance of the EMMA. The present invention is not limited to a specific embodiment of the conflict resolution.

The EMMA may provide navigation controls within each view to allow the user 100 to navigate between the views. For example, the EMMA may provide linear navigation controls which allow the user 100 to advance to a "Next View" and/or to go back to a "Previous View". Alternatively, the EMMA may provide a general navigation mechanism which may allow the user 100 to switch from a current view to any of the other available views and/or sub-views. The EMMA may provide a drop-down menu, a series of view icons, a series of graphical tabs and/or the like to allow the user 100 to select a new view and/or a new sub-view in order to transition to the new view and/or the new sub-view.

FIG. 6 generally illustrates a method 800 for managing, controlling and/or rendering media in a network. Use of the EMMA may begin with the Search View as generally shown at step 801, may then progress to the Workspace View as generally shown at step 803, and/or may then progress to the Network View as generally shown at step 810. The linear navigation controls which may be provided by the EMMA may be employed by the user to progress through the views. Alternatively, the user may switch arbitrarily between the views as generally shown at steps 801, 803, and 810, respectively. The general navigation mechanism which may be provided by the EMMA may allow the user to switch arbitrarily between the views.

Use of the EMMA may begin with the Search View as generally shown at step 801, and the EMMA may display a list of available servers, display a list of available filters and/or provide a mechanism by which the user may enter search terms, may select one or more of the available content filters and/or may restrict the search to a subset of the available servers. The EMMA may perform a search based on the search terms, the selected content filters and/or the server restrictions as generally shown at step 802.

The EMMA may transition to the Workspace View as generally shown at step 803, may display the search results, may display a list of available renderers and/or may display the available library of Stored Compilations. The EMMA may generally allow the user to browse, organize, edit, manage, control and/or render the available media using the various functions of the Workspace View as previously set forth. The EMMA may allow the user to create, edit, store and/or manage a Compilation Object using an Editing Pane as generally shown at step 805. The EMMA may allow the user to direct a simple media object, a composite media object, a stored compilation object, and/or the current contents of the Editing Pane to one of the available rendering devices or rendering groups as generally shown at step 806. The EMMA may allow the user to preview a simple media object, a composite media object, a stored compilation object, and/or the current contents of the Editing Pane using a local rendering capability as generally shown at step 807. The EMMA 2 may allow the user to associate two or more of the available renderers to form a Rendering Group as generally shown at step 808. The EMMA may allow the user to control the media playback functions of a selected rendering device using media playback controls as generally shown at step 809. The EMMA may allow the user to adjust the search terms, the selected content filters and/or the server restrictions to change and/or improve the search results as generally shown at step 804.

The EMMA may allow the user to transition to the Network View as generally shown at step 810 and/or may display information about the various servers, various rendering devices, and/or various media connections in the network. The EMMA may allow the user to access the various functions of the Network View to view, to obtain details about, to control, and/or to troubleshoot the various servers, the various rendering devices and/or the various media connections in the network. The EMMA may allow the user to select an "Active Devices" sub-view to view information about currently active rendering devices as generally shown at step 811. The EMMA may allow the user to select a Connections sub-view in order to view the various servers, the various rendering devices and/or the various media connections which may be present in the network as generally shown at step 812. The EMMA may allow the user to highlight a specific rendering device, a specific server, and/or a specific media connection in order to obtain detail information about the highlighted object as generally shown at step 813. The EMMA may allow the user to control the playback of media on a selected renderer using media playback controls as generally shown at step 814. Additionally, the EMMA may allow the user to re-route, duplicate, delete and/or control any of the displayed media connections to configure and/or control rendering of the associated media flow as generally shown at step 815.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for managing media in a network wherein a terminal, a plurality of rendering devices, and a plurality of media servers are connected to the network and further wherein each media server of the plurality of media servers stores media files, the method comprising the steps of:
    displaying a first plurality of icons wherein each icon of the first plurality of icons represents one of the media servers wherein the terminal displays the first plurality of icons;
    displaying a second plurality of icons wherein each icon of the second plurality of icons represents one of the rendering devices wherein the terminal displays the second plurality of icons; and
    displaying a first graphic representation in a first position which extends from a first point adjacent to a first icon of the first plurality of icons to a second point adjacent to a second icon of the second plurality of icons wherein the first icon represents a first media server of the plurality of media servers wherein the second icon represents a first rendering device of the plurality of rendering devices and further wherein the first graphic representation indicates transmission of a first media file from the first media server to the first rendering device wherein the terminal displays the first graphic representation.

2. The method of claim 1 further comprising the steps of:
    modifying the first graphic representation to extend from the first point adjacent to the first icon to a third point adjacent to a third icon wherein the third icon represents a second rendering device of the plurality of rendering devices wherein a user input accepted by the terminal modifies the first graphic representation by moving a termination point of the first graphic representation from the second point adjacent to the second icon to the third point adjacent to the third icon;
    stopping transmission of the first media file from the first media server to the first rendering device wherein the transmission is stopped in response to the modification of the first graphic representation; and
    transmitting the first media file from the first media server to the second rendering device wherein the first media file is transmitted to the second rendering device in response to the modification of the first graphic representation.

3. The method of claim 1 further comprising the steps of:
    creating a second graphic representation associated with the first graphic representation wherein the second graphic representation is created based on a first user input accepted by the terminal which requests duplication of the first graphic representation and further wherein the first graphic representation and the second graphic representation are displayed simultaneously;

connecting the second graphic representation to a third icon wherein the third icon represents a second rendering device of the plurality of rendering devices wherein a second user input accepted by the terminal connects the second graphic representation to the third icon; and transmitting the first media file from the first media server to the second rendering device in response to connection of the second graphic representation to the third icon wherein the first rendering device and the second rendering device provide synchronized playback of the first media file.

4. The method of claim 3 wherein the first graphic representation and the second graphic representation are identical in appearance.

5. The method of claim 1 wherein the first graphic representation is graphically distinct from another graphic representation simultaneously displayed on the terminal.

6. The method of claim 1 wherein the first graphic representation is color-coded.

7. The method of claim 1 further comprising the step of:
displaying a second graphic representation in a second position which extends from a third point adjacent to a third icon of the first plurality of icons to a fourth point adjacent to a fourth icon of the second plurality of icons wherein the third icon represents a second media server of the plurality of media servers wherein the fourth icon represents a second rendering device of the plurality of rendering devices and further wherein the second graphic representation indicates transmission of a second media file from the second media server to the second rendering device.

8. The method of claim 7 further comprising the step of:
creating the second graphic representation in response to a first user input accepted by the terminal which requests the second graphic representation wherein the second graphic representation is different than the first graphic representation.

9. The method of claim 7 further comprising the step of:
displaying the first graphic representation and the second graphic representation simultaneously.

10. The method of claim 7 wherein the first graphic representation and the second graphic representation are graphically distinguishable.

11. The method of claim 1 further comprising the steps of:
accepting a user input on the terminal wherein the user input requests deletion of the first graphic representation;
deleting the first graphic representation in response to the user input; and
stopping transmission of the first media file from the first media server to the first rendering device wherein the transmission is stopped in response to the deletion of the first graphic representation.

12. The method of claim 1 further comprising the steps of:
accepting a user input on the terminal wherein the user input selects the first graphic representation; and
displaying a preview of the first media file wherein the preview of the first media file is displayed in a user interface provided by the terminal wherein the terminal displays the preview of the first media file in response to the selection of the first graphic representation and further wherein the first media file is simultaneously rendered by the first rendering device.

13. The method of claim 1 further comprising the step of:
graphically flagging the first graphic representation to indicate a problem with the transmission of the first media file from the first media server to the first rendering device.

14. The method of claim 1 further comprising the step of:
graphically flagging the first graphic representation to indicate that the transmission of the first media file from the first media server to the first rendering device is in a paused state.

15. The method of claim 1 further comprising the steps of:
highlighting an icon in response to a first user input accepted by the terminal wherein the icon represents one of the plurality of media servers; and
displaying information about the one of the plurality of media servers wherein the terminal displays the information in response to highlighting the icon.

16. The method of claim 1 further comprising the steps of:
highlighting an icon in response to a first user input accepted by the terminal wherein the icon represents one of the plurality of rendering devices; and
displaying information about the one of the plurality of rendering devices wherein the terminal displays the information in response to highlighting the icon.

17. The method of claim 1 further comprising the step of:
using UPnP Control Point protocols to determine that the plurality of rendering devices and the plurality of media servers are connected to the network.

18. A system for managing media in a network, the system comprising:
a first terminal connected to the network;
a first rendering device connected to the network;
a second rendering device connected to the network wherein the first rendering device and the second rendering device are different rendering devices;
a first server connected to the network wherein the first server stores a first plurality of media files;
a second server connected to the network wherein the second server stores a second plurality of media files and further wherein the first server and the second server are different servers;
a first set of icons which represent available servers connected to the network and accessible through the network wherein the first set of icons includes a first icon which corresponds to the first server and a second icon which corresponds to the second server;
a second set of icons which represent available rendering devices connected to the network wherein the second set of icons includes a third icon which corresponds to the first rendering device and a fourth icon which corresponds to the second rendering device and further wherein the first terminal displays the first set of icons and the second set of icons simultaneously and further wherein a first media file of the first plurality of media files from the first server is transmitted to and played on the first rendering device; and
a graphic representation displayed in a first position which extends from a first point adjacent to the first icon to a second point adjacent to the third icon in response to initiation of transmittal of the first media file from the first server to the first rendering device wherein the graphic representation indicates transmission of the first media file from the first server to the first rendering device.

19. The system of claim 18 further comprising:
an additional graphic representation which indicates that the third icon and the fourth icon were selected in combination wherein the first rendering device and the second rendering device automatically provide synchronized playback of the first media file in response to user input directing one of the first rendering device and the second rendering device to play the first media file and further wherein the user input is accepted by the terminal after displaying the additional graphic representation.

20. The system of claim 18 further comprising:
a control point element that determines that the plurality of rendering devices and the plurality of media servers are connected to the network.

* * * * *